(12) United States Patent
Hutchison et al.

(10) Patent No.: US 10,691,957 B2
(45) Date of Patent: Jun. 23, 2020

(54) METHOD FOR INCREASING THE ACCURACY OF TRAFFIC CAMERAS USING OPTICAL MASKING TECHNOLOGY

(71) Applicant: ITS Plus, Inc., Plano, TX (US)

(72) Inventors: Michael Cole Hutchison, Plano, TX (US); Staci Marlea Ingram, Arlington, TX (US)

(73) Assignee: ITS Plus, Inc., Plano, TX (US)

(*) Notice: Subject to any disclaimer, the term of this patent is extended or adjusted under 35 U.S.C. 154(b) by 97 days.

(21) Appl. No.: 15/894,893

(22) Filed: Feb. 12, 2018

(65) Prior Publication Data

US 2019/0251368 A1    Aug. 15, 2019

(51) Int. Cl.
| | | |
|---|---|---|
| *G06K 9/00* | (2006.01) | |
| *G08G 1/01* | (2006.01) | |
| *G08G 1/015* | (2006.01) | |
| *G08G 1/017* | (2006.01) | |
| *G08G 1/04* | (2006.01) | |
| *G08G 1/052* | (2006.01) | |
| *G08G 1/054* | (2006.01) | |
| *G08G 1/08* | (2006.01) | |
| *H04N 5/272* | (2006.01) | |

(52) U.S. Cl.
CPC ............ *G06K 9/00785* (2013.01); *G08G 1/01* (2013.01); *G08G 1/0104* (2013.01); *G08G 1/015* (2013.01); *G08G 1/0116* (2013.01); *G08G 1/0145* (2013.01); *G08G 1/04* (2013.01); *G08G 1/052* (2013.01); *G08G 1/054* (2013.01); *G08G 1/08* (2013.01); *H04N 5/272* (2013.01); *G08G 1/0175* (2013.01)

(58) Field of Classification Search
None
See application file for complete search history.

(56) References Cited

U.S. PATENT DOCUMENTS

| | | | | |
|---|---|---|---|---|
| 2008/0024623 | A1* | 1/2008 | Seo | H04N 5/235 348/229.1 |
| 2008/0169912 | A1* | 7/2008 | Kawasaki | G06K 9/00805 340/425.5 |
| 2008/0170754 | A1* | 7/2008 | Kawasaki | G06K 9/00805 382/104 |
| 2009/0015683 | A1* | 1/2009 | Ando | B60R 1/00 348/222.1 |
| 2015/0002672 | A1* | 1/2015 | Hayakawa | B60R 1/00 348/148 |
| 2015/0201120 | A1* | 7/2015 | Irie | H04N 5/2171 348/148 |

(Continued)

OTHER PUBLICATIONS

Christianson et al., "Methods to Address Headlight Glare," California PATH Research Report, UCB-ITS-PRR-2009-20, University of California, Berkeley, Mar. 2009, ISSN 1055-1425 (Year: 2009).*

*Primary Examiner* — Soo Shin
(74) *Attorney, Agent, or Firm* — Yee & Associates, P.C.

(57) ABSTRACT

A method of managing traffic flow. The method includes receiving, at a camera, an image containing vehicle traffic flow. The method also includes processing, using a processor, the image to mask areas in the image that exceed a predetermined number of candelas. The method also includes thereafter analyzing, using the processor, the image to determine a parameter related to the vehicles, whereby an analysis is performed. The method also includes managing the traffic flow based on the analysis.

21 Claims, 4 Drawing Sheets

(56) References Cited

U.S. PATENT DOCUMENTS

2015/0278616 A1* 10/2015 Li ................... G06K 9/00825
                                                    382/103
2018/0314902 A1* 11/2018 Suzuki ............. G06K 9/00818

* cited by examiner

Hutchison.006

METHOD FOR INCREASING THE ACCURACY OF TRAFFIC CAMERAS USING OPTICAL MASKING TECHNOLOGY

BACKGROUND INFORMATION

1. Field

The present disclosure relates to methods and devices for increasing the accuracy of traffic cameras using masking technology.

2. Background

Traffic cameras have been used by governmental and private entities to track vehicle traffic and modify the timing of traffic signals accordingly. In particular, optical-based vehicle detection systems commonly used by transportation agencies require a high degree of reliability and performance.

At a traffic intersection with vehicle detection technology, a missed vehicle could sit at the intersection indefinitely. As a result, the traffic signal light might stay red for longer than desired, possibly indefinitely. Additionally, sooner or later, a vehicle will choose to run the red light which is not changing. As a result, a public safety hazard may be created. This phenomenon is undesirable.

Additionally, bright lights in the field of view of the camera can cause vehicles to be missed. Bright lights may be generated by vehicles from their headlights on high beam, reflected from wet or icy pavement, from cars, or from other sources. Direct sunlight and glare during sunrise and sunset often cause a vehicle detection algorithm to become less effective; sometimes to the point of completely missing a vehicle approaching a stoplight, which is also undesirable.

SUMMARY

The illustrative embodiments provide for a method of managing traffic flow. The method includes receiving, at a camera, an image containing vehicle traffic flow. The method also includes processing, using a processor, the image to mask lit headlights of vehicles in the image that exceed a predetermined number of candelas. The method also includes thereafter analyzing, using the processor, the image to determine a parameter related to the vehicles, whereby an analysis is performed. The method also includes managing the traffic flow based on the analysis.

The illustrative embodiments also provide for a method of managing traffic flow. The method includes receiving, at a camera, an image containing vehicle traffic flow. The method also includes processing, using a processor, the image to mask glare emanating from vehicles in the image that exceed a predetermined number of candelas. The method also includes thereafter analyzing, using the processor, the image to determine a parameter related to the vehicles, whereby an analysis is performed. The method also includes managing the traffic flow based on the analysis.

The illustrative embodiments also provide for a method of managing traffic flow. The method includes receiving, at a camera, an image containing vehicle traffic flow. The method also includes processing, using a processor, the image to mask glare emanating from one or more of a building, a sign, or a road in the image, when the glare exceeds a predetermined number of candelas. The method also includes thereafter analyzing, using the processor, the image to determine a parameter related to the vehicles, whereby an analysis is performed. The method also includes managing the traffic flow based on the analysis.

The illustrative embodiments also provide for a method of managing traffic flow. The method includes receiving, at a camera, an image containing vehicle traffic flow. The method also includes processing, using a processor, the image to mask at least a portion of a horizon or at least a portion of a sky when light in the horizon or the sky exceeds a predetermined number of candelas. The method also includes thereafter analyzing, using the processor, the image to determine a parameter related to the vehicles, whereby an analysis is performed. The method also includes managing the traffic flow based on the analysis.

The illustrative embodiments also provide for a method of managing traffic flow. The method includes receiving, at a camera, an image containing vehicle traffic flow. The method also includes processing, using a processor, the image to mask areas in the image that exceed a predetermined number of candelas. The method also includes after processing, adding edges, which comprise dark lines, around the areas. The method also includes thereafter analyzing, using the processor, the image to determine a parameter related to the vehicles, whereby an analysis is performed. The method also includes managing the traffic flow based on the analysis.

The illustrative embodiments also provide for a method of managing traffic flow. The method includes receiving, at a camera having an iris, an image containing vehicle traffic flow. The method also includes processing, using a processor, the image to mask areas in the image that exceed a predetermined number of candelas. The method also includes after processing, determining whether an area in the areas remains above the predetermined number of candelas. The method also includes, only after determining that the area remains above the predetermined number of candelas, reducing an aperture of the iris until the area is below the predetermined number of candelas. The method also includes thereafter analyzing, using the processor, the image to determine a parameter related to the vehicles, whereby an analysis is performed. The method also includes managing the traffic flow based on the analysis.

The illustrative embodiments also provide for a method of managing traffic flow. The method includes receiving, at a camera, an image containing vehicle traffic flow. The method also includes processing, using a processor, the image to mask areas in the image that exceed a predetermined number of candelas. The method also includes thereafter analyzing, using the processor, the image to determine a parameter related to the vehicles, whereby an analysis is performed. The method also includes managing the traffic flow based on the analysis.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
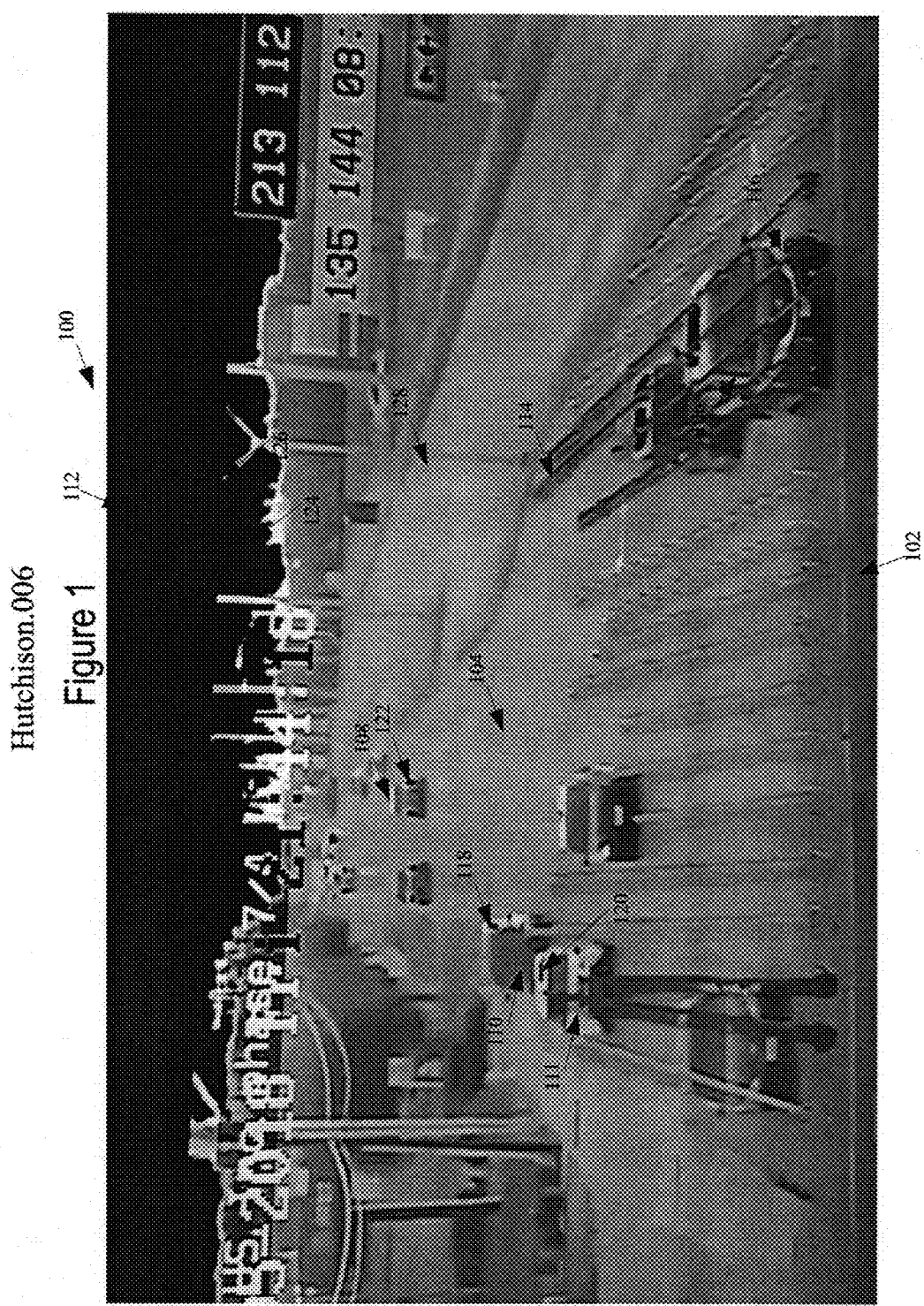
FIG. 1 illustrates an image taken by a traffic camera, wherein bright areas are masked, in accordance with an illustrative embodiment.

Unless otherwise provided, as used herein, the term "vehicle" refers to any kind of vehicle which may be subject to traffic signals. Thus, for surface roads, the term "vehicle" refers to automobiles (cars and trucks), commercial trucks and other commercial vehicles, motorcycles, bicycles, mopeds, tractors, and other forms of vehicles that may be required by law to obey traffic signals. For waterways, the term "vehicle" includes boats, ships, kayaks, or any other form of water vehicle that may be subject to regulation at an intersection of a waterway. For airports, taxiing aircraft may be subject to ground traffic signals, and thus are also "vehicles." For rail road systems, the term "vehicle" includes trains or other vehicles which may be subject to train signals. However, while the term "vehicle" by itself is broadly interpreted, the illustrative embodiments are especially applicable to motor vehicles and man powered vehicles that are subject to regulation by traffic signals at roadway intersections. Claims that reference vehicles, but specifically refer to parts of motor vehicles and man powered vehicles that are subject to such regulation, should be interpreted as being limited to types of vehicles that operate on terrestrial roadways subject to traffic signals.

The illustrative embodiments recognize and take into account that thermal cameras, sometimes known as infrared cameras, have been used to solve bright light issues in traffic cameras. However, thermal cameras are very expensive and can have temperature difference issues which can cause errors in vehicle detection. Specifically, in very hot or cold conditions, vehicles can be missed because the vehicle cannot be distinguished from the environment. For example, a recently started vehicle will be close to the same temperature as the surrounding environment, as can a long running car in a hot environment. Still further, pavement marking used to draw detection zones used with image software algorithms are invisible. Thus, thermal cameras are an unsatisfactory solution to the problem of overly bright areas in optical traffic camera use.

The illustrative embodiments also recognize and take into account that some cameras employ sharpness settings to adjust for brightness issues. However, sharpness settings create a computer-generated line around all objects in the field of view. Thus, this technique will result in a computer generation of an imaginary line around the shadow of a vehicle. If the vehicle shadow passes into an adjacent lane, the vehicle detection system can think the shadow is an actual moving vehicle and generate a false detection. Thus, this technique is also undesirable.

Therefore, the illustrative embodiments provide for an optical mask technology (OMT). The optical mask technology of the illustrative embodiments does not produce the type of missed vehicle or false detection issues associated with thermal cameras or camera sharpness settings.

The optical mask technology of the illustrative embodiments blocks high candela light sources in an image. A "candela" is a unit of measurement which represents how bright something is. Another unit of measurement could be a "lumen." In any case, the illustrative embodiments enhance any optical vehicle detection devices by minimizing or eliminating a high candela source that can cause image processing software to miss vehicles. In addition to masking the bright light source, the illustrative embodiments may provide for a computer generated black and white edge which can be added. This edge can also increase the ability of a vehicle to be detected by image processing software associated with the traffic camera.

The illustrative embodiments also recognize and take into account that glare can be reduced by reducing the camera aperture, or the camera iris, just as a human may squint in a glare to reduce the amount of light reaching the eye. However, a smaller iris will flatten out the picture, making the edges more muted. When edges are more muted, detecting a vehicle is more difficult. Furthermore, a smaller iris will also make a dark car on a dark pavement in a shadow harder to detect because there are no edges or highly muted edges.

In contrast, the optical masking technology of the illustrative embodiments blocks the glare. As a result, the camera automatic iris will automatically open up, letting in more light. This result sharpens the image and provides more contrast, which in turn increases detection which means fewer missed vehicles.

The illustrative embodiments further recognize and take into account that optical based vehicle detection devices can look for edges. An edge is a line or lines between structures of a given size. For example, an edge may be the transition of a tire to the vehicle body, or could be the transition of a chrome bumper to a vehicle body.

However, to increase aerodynamics, many car manufactures attempt to make their vehicles as smooth as possible. This fact reduces both the wind resistance and the optical signal of a vehicle. Hence, modern vehicles may present there are almost no edges.

Edges are registered by the image processing algorithm in the digital signal processor (DSP) as shades of grey on a scale from 0 to 255, with 0 being pure white and 255 being completely dark. A typical vehicle edge may be 50 on one side and 125 on the other with a contrast difference of 75. In contrast, the optical masking technology of the illustrative embodiments produces the highest contrast edge relative to other image processing technologies, with 0 on one side and 255 on the other for a contrast difference of 255.

The higher the contrast difference, the less chance of missing a vehicle. When a high contrast edge is produced on a moving vehicle, such as around the car headlight or glare from the vehicle due to the sun reflecting off the surface, the chance of the vehicle being detected is greatly enhanced.

Thus, the illustrative embodiments recognize and take into account that, by masking bright lights and generating a high contrast edge, the performance of any optical vehicle detection system can be greatly improved. Accordingly, any kind of bright light can be removed from an image taken by a traffic camera, with removing performed either by hardware or by a processor executing an image processing algorithm. Examples include, but are not limited to, the rising or setting sun, glare resulting from sunlight reflection in the sky, on the road, on vehicles, or off of surrounding buildings, signs, or other structures. Furthermore, headlights of cars can be masked, as well as any other source of light which is above a predetermined candela limit. Subsequently, the processed image is provided to a traffic tracking algorithm which, when executed by a computer, is able to count or otherwise detect and process vehicles with a greatly reduced chance of error of either missing a vehicle that is actually present or counting a vehicle when none is present.

The illustrative embodiments may be further varied. For example, the iris of a camera may open and close based on the amount of light in the field of view after masking. When a very bright background is present even after masking, such as direct sunlight at particular angles, the camera's automatic iris can become smaller. However, this embodiment may be less desirable in some instances due to the flattening of images as described above. However, the optical masking technology of the illustrative embodiments may be used to reduce the extent of automatic iris closure, thereby improving traffic algorithm performance relative to closing the iris further as when no masking is performed.

Thus, the illustrative embodiments have several uses. For example, the optical masking technology of the illustrative embodiments may be used to block light coming from headlights of traffic vehicles. In another example, the optical masking technology of the illustrative embodiments may be used to block the glare from a traffic vehicle headlight reflected off the pavement. This latter event is common when the pavement has ice, snow or water on it.

In another example, the optical masking technology of the illustrative embodiments may be used to block the setting sun or bright sky. In still another example, the optical masking technology of the illustrative embodiments may be used to block the glare by generating a mask with a very high contrast edge when a bright light is generated or reflected off of a vehicle or surface. The high contrast edge is a computer-generated image that will trigger video detection software.

In yet another example, the optical masking technology of the illustrative embodiments may be used to block high candela light sources in the field of view, while simultaneously narrowing automatically the iris of a camera. However, combined with masking, the amount of iris closure is limited relative to without the use of masking. Again, a more open iris creates a higher image contrast. Higher contrast edges translate into better detection of vehicles.

FIG. 1 illustrates an image taken by a traffic camera, wherein bright areas are masked, in accordance with an illustrative embodiment. Image 100 is taken by a camera disposed in order to monitor one or more areas of intersection 102 of roads. The camera may be either a still camera or a video camera, though preferably the camera is capable of taking video. Because image 100 is taken from the point of view of the camera, the camera itself is not shown in FIG. 1.

Image 100 contains a number of features, including road 104 and a number of vehicles, such as but not limited to vehicle 106, vehicle 108, vehicle 110, and vehicle 111. Other features are shown in the background, including buildings, signs, light posts, and trees. Additionally, horizon or sky 112 is shown in the far background. Image 100 also includes a number of computer-drawn arrows, such as but not limited to arrow 114. These computer-drawn arrows are used by a traffic monitoring algorithm to count cars and show their velocity.

As can be seen in FIG. 1, a number of areas in image 100 have been masked. For example, area 116, area 118, area 120, area 122, area 124, and area 126 have all been masked. Area 116 corresponds to an area of solar glare from vehicle 106. Area 118 corresponds to an area of solar glare from vehicle 110. Area 120 corresponds to an area of solar glare from vehicle 111. Area 122 corresponds to switched-on headlights of vehicle 108. Area 124 corresponds to the sky, which may be overly bright due to a rising or setting sun. Area 126 corresponds to a light emitted from street lamp 128, or possibly from a glare from the same. Other masked areas are also shown in FIG. 1.

Masking, as used herein, refers to using imaging processing to convert an area in an image from its actual representation as taken by the camera to a black or greyed-out area. Masking is performed responsive to a processor determining that one or more pixels in an area of image 100 are too bright. As used herein, "too bright" refers to a pixel or pixels being colored or having an intensity indicating that the brightness of that area is above a predetermined number of candelas, lumens, or other measure of light intensity. By masking these areas, the traffic system more accurately measures parameters with respect to the vehicles in image 100, including but not limited to their number, their position, their velocity, their make and model, their license plate numbers, whether any vehicles are in violation of traffic laws, and any other desirable parameter. Thus, the illustrative embodiments contemplate these and other parameters: a number of the vehicles in the image, a speed at which the vehicles are moving in the image, a number of vehicles waiting at an intersection in the image, and types of the vehicles in the image.

Optionally, the processor may add edges to masked areas. Edges are lines drawn around a masked area. Edges can increase contrast, and as described above, thereby further increase the accuracy of measured parameters of vehicles in image 100.

Once image 100 has been processed by masking, the processed image is then analyzed to aid in managing traffic. For example, if a vehicle arrives at an otherwise quiet intersection, the processor may trigger the traffic signals to change accordingly. In another example, if a predetermined number of cars are waiting at on side of an intersection, the processor may trigger the traffic signals to change accordingly to allow those cars to pass through the intersection. Thus, the illustrative embodiments contemplate adjusting traffic light operation at an intersection at which the camera is located, notifying an authority of a traffic violation of a particular vehicle in the vehicles, notifying emergency services based on an event detected in the image, and recording and storing the image for future traffic flow study. Many other changes to the traffic signals are contemplated in response to a variety of stimuli as detected in image 100.

Figure 2:
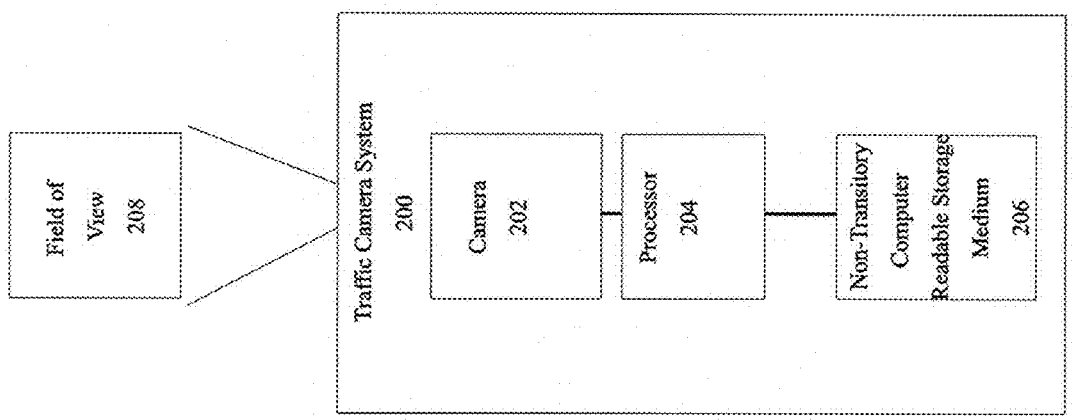
FIG. 2 is a traffic camera system, in accordance with an illustrative embodiment.

FIG. 2 is a traffic camera system, in accordance with an illustrative embodiment. Traffic camera system 200 includes camera 202, processor 204, and non-transitory computer readable storage medium 206. Non-transitory computer readable storage medium 206 may include program code which, when executed by processor 204, performs a computer-implemented method, such as those described below with respect to FIG. 3, or elsewhere herein. Additionally, non-transitory computer readable storage medium 206 may contain program code for performing any of the optical masking techniques for improving traffic flow, as described above. Thus, traffic camera system 200 may be used to mask areas of an image taken by camera 202 in order to increase contrast and more readily identify cars within field of view 208 of camera 202.

Figure 3:
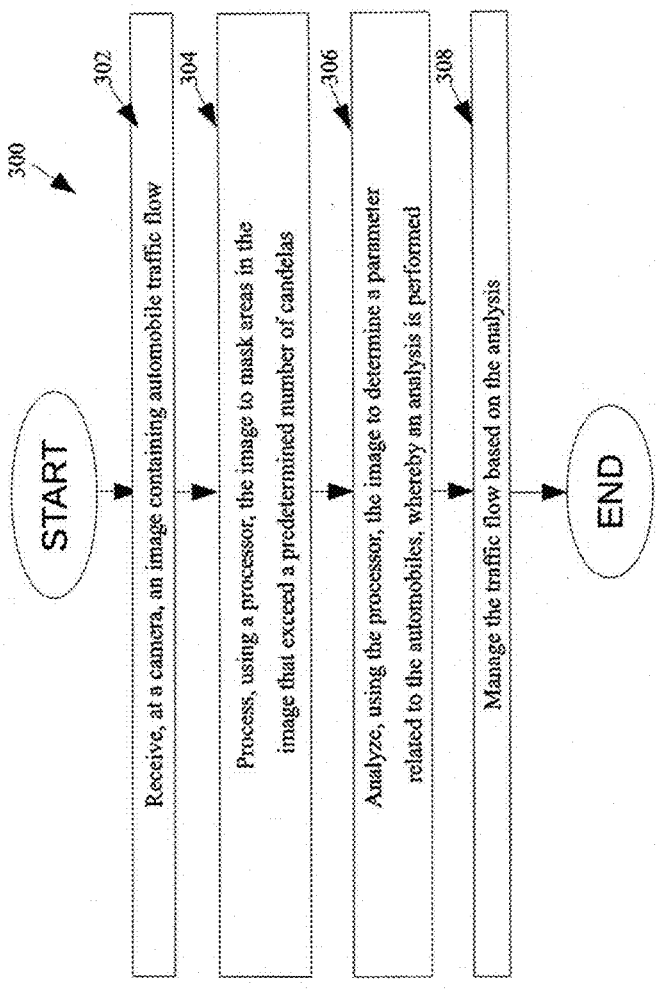
FIG. 3 is a method of managing traffic, in accordance with an illustrative embodiment.

FIG. 3 is a method of managing traffic, in accordance with an illustrative embodiment. Method 300 may be implemented by a traffic camera system, such as those described with respect to FIG. 1, or by traffic camera system 200 of FIG. 2. Method 300 may be characterized as a method of managing traffic flow.

Method 300 includes receiving, at a camera, an image containing vehicle traffic flow (operation 302).

Method 300 also includes processing, using a processor, the image to mask areas in the image that exceed a predetermined number of candelas (operation 304). Method 300 also includes, thereafter, analyzing, using the processor, the image to determine a parameter related to the vehicles, whereby an analysis is performed (operation 306). Method 300 also includes managing the traffic flow based on the analysis (operation 308). In one illustrative embodiment, the method may terminate thereafter.

Method 300 may be varied. For example, the parameter may be one or more of: a number of the vehicles in the image, a speed at which the vehicles are moving in the image, a number of vehicles waiting at an intersection in the image, and types of the vehicles in the image. In another variation, managing may be one or more of: adjusting traffic light operation at an intersection at which the camera is located, notifying an authority of a traffic violation of a particular vehicle in the vehicles, notifying emergency services based on an event detected in the image, and recording and storing the image for future traffic flow study.

Still other variations are possible. For example, operation 304 may specifically be limited to processing, using a processor, the image to mask lit headlights of vehicles in the image that exceed a predetermined number of candelas. Alternatively, operation 304 may be limited to processing, using a processor, the image to mask glare emanating from vehicles in the image that exceed a predetermined number of candelas.

In still another variation, operation 304 may be limited to processing, using a processor, the image to mask glare emanating from one or more of a building, a sign, or a road in the image, when the glare exceeds a predetermined number of candelas. In yet another variation, operation 304 may be limited to processing, using a processor, the image to mask at least a portion of a horizon or at least a portion of a sky when light in the horizon or the sky exceeds a predetermined number of candelas.

Still further, additional operations may be present. For example, method 300 may include the additional operation of, after processing, adding edges, which comprise dark lines, around the areas. In a still different variation, method 300 may also include, after processing, determining whether an area in the areas remains above the predetermined number of candelas. In this case, only after determining that the area remains above the predetermined number of candelas, method 300 may also include reducing an aperture of the iris until the area is below the predetermined number of candelas.

Still other variations are possible. Thus, the examples given with respect to FIG. 3 do not necessarily limit the claimed inventions.

Figure 4:
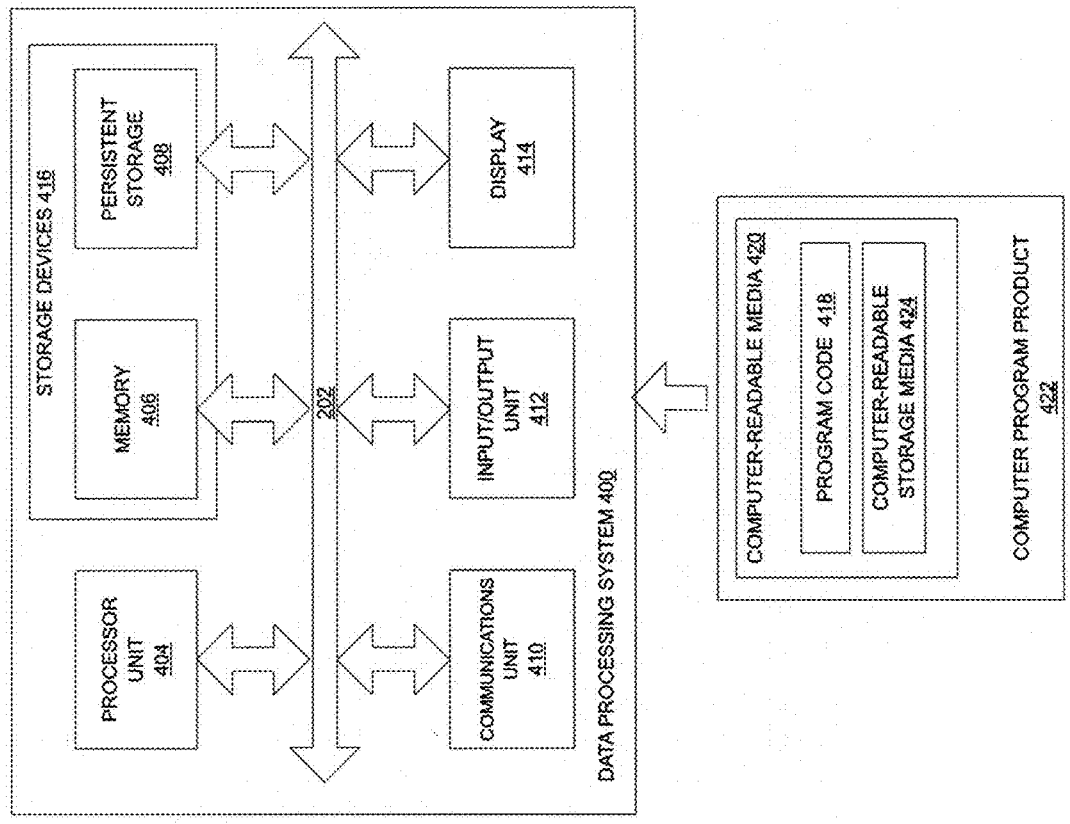
FIG. 4 illustrates a data processing system, in accordance with an illustrative embodiment.

Turning now to FIG. 4, an illustration of a data processing system is depicted in accordance with an illustrative embodiment. Data processing system 400 in FIG. 4 is an example of a data processing system that may be used to implement the illustrative embodiments, such the camera which produced image 100 of FIG. 1, traffic camera system 200 of FIG. 2, method 300 of FIG. 3, or any other module or system or process disclosed herein. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. This software may be a content addressable memory, or software for implementing the processes described elsewhere herein. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output (I/O) unit 412 allows for input and output of data with other devices that may be connected to data processing system 400. For example, input/output (I/O) unit 412 may provide a connection for user input through a keyboard, a mouse, and/or some other suitable input device. Further, input/output (I/O) unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of managing traffic flow, the method comprising:
    receiving, at a traffic camera, an image containing the traffic flow;
    processing, using a processor, the image to mask a plurality of regions in the image that exceed a predetermined number of candelas, wherein the plurality of regions includes at least a portion of a sky and lit headlights of vehicles;
    thereafter analyzing, using the processor, the image to determine a parameter related to the vehicles;
    performing a second analysis, using the processor, on the analyzed image according to a traffic tracking algorithm; and
    managing the traffic flow based on the second analysis.

2. The method of claim 1, wherein the parameter comprises one or more of: a number of the vehicles in the image, a speed at which the vehicles are moving in the image, a number of the vehicles waiting at an intersection in the image, and types of the vehicles in the image.

3. The method of claim 1, wherein the managing step comprises one or more of: adjusting traffic light operation at an intersection at which the traffic camera is located, notifying an authority of a traffic violation of a particular vehicle in the vehicles, notifying emergency services based on an event detected in the image, and recording and storing the image for future traffic flow study.

4. A method of managing traffic flow, the method comprising:
    receiving, at a traffic camera, an image containing the traffic flow;
    processing, using a processor, the image to mask a plurality of regions in the image that exceed a predetermined number of candelas, wherein the plurality of regions includes at least a portion of a sky and glare emanating from vehicles;
    thereafter analyzing, using the processor, the image to determine a parameter related to the vehicles;
    performing a second analysis, using the processor, on the analyzed image according to a traffic tracking algorithm; and
    managing the traffic flow based on the second analysis.

5. The method of claim 4, wherein the parameter comprises one or more of: a number of the vehicles in the image, a speed at which the vehicles are moving in the image, a number of the vehicles waiting at an intersection in the image, and types of the vehicles in the image.

6. The method of claim 4, wherein the managing step comprises one or more of: adjusting traffic light operation at an intersection at which the traffic camera is located, notifying an authority of a traffic violation of a particular vehicle in the vehicles, notifying emergency services based on an event detected in the image, and recording and storing the image for future traffic flow study.

7. A method of managing traffic flow, the method comprising:
    receiving, at a traffic camera, an image containing the traffic flow;
    processing, using a processor, the image to mask a plurality of regions in the image that exceed a predetermined number of candelas, wherein the plurality of regions includes at least a portion of a sky and glare emanating from one or more of a building, a sign, or a road;
    thereafter analyzing, using the processor, the image to determine a parameter related to vehicles in the traffic flow; and
    performing a second analysis, using the processor, on the analyzed image according to a traffic tracking algorithm; and
    managing the traffic flow based on the second analysis.

8. The method of claim 7, wherein the parameter comprises one or more of: a number of the vehicles in the image, a speed at which the vehicles are moving in the image, a number of the vehicles waiting at an intersection in the image, and types of the vehicles in the image.

9. The method of claim 7, wherein the managing step comprises one or more of: adjusting traffic light operation at an intersection at which the traffic camera is located, notifying an authority of a traffic violation of a particular vehicle in the vehicles, notifying emergency services based on an event detected in the image, and recording and storing the image for future traffic flow study.

10. A method of managing traffic flow, the method comprising:
    receiving, at a traffic camera, an image containing the traffic flow;
    processing, using a processor, the image to mask a plurality of regions in the image that exceed a predetermined number of candelas, wherein the plurality of regions includes at least a portion of a horizon and lit headlights of vehicles;
    thereafter analyzing, using the processor, the image to determine a parameter related to vehicles in the traffic flow;
    performing a second analysis, using the processor, on the analyzed image according to a traffic tracking algorithm; and
    managing the traffic flow based on the second analysis.

11. The method of claim 10, wherein the parameter comprises one or more of: a number of the vehicles in the image, a speed at which the vehicles are moving in the image, a number of the vehicles waiting at an intersection in the image, and types of the vehicles in the image.

12. The method of claim 10, wherein the managing step comprises one or more of: adjusting traffic light operation at an intersection at which the traffic camera is located, notifying an authority of a traffic violation of a particular vehicle in the vehicles, notifying emergency services based on an event detected in the image, and recording and storing the image for future traffic flow study.

13. A method of managing traffic flow, the method comprising:
   receiving, at a traffic camera, an image containing the traffic flow;
   processing, using a processor, the image to mask a plurality of areas in the image that exceed a predetermined number of candelas, wherein the plurality of areas includes at least a portion of a sky and lit headlights of vehicles;
   after processing, adding edges, which comprise dark lines, around the plurality of areas;
   thereafter analyzing, using the processor, the image to determine a parameter related to vehicles in the traffic flow;
   performing a second analysis, using the processor, on the analyzed image according to a traffic tracking algorithm; and
   managing the traffic flow based on the second analysis.

14. The method of claim 13, wherein the parameter comprises one or more of: a number of the vehicles in the image, a speed at which the vehicles are moving in the image, a number of the vehicles waiting at an intersection in the image, and types of the vehicles in the image.

15. The method of claim 13, wherein the managing step comprises one or more of: adjusting traffic light operation at an intersection at which the traffic camera is located, notifying an authority of a traffic violation of a particular vehicle in the vehicles, notifying emergency services based on an event detected in the image, and recording and storing the image for future traffic flow study.

16. A method of managing traffic flow, the method comprising:
   receiving, at a traffic camera having an iris, an image containing the traffic flow;
   processing, using a processor, the image to mask a plurality of areas in the image that exceed a predetermined number of candelas, wherein the plurality of areas includes at least a portion of a sky and lit headlights of vehicles;
   after processing, determining whether any of the plurality of areas in the image remain above the predetermined number of candelas;
   only after determining that an area in the image remains above the predetermined number of candelas, reducing an aperture of the iris until the area is below the predetermined number of candelas;
   thereafter analyzing, using the processor, the image to determine a parameter related to vehicles in the traffic flow;
   performing a second analysis, using the processor, on the analyzed image according to a traffic tracking algorithm; and
   managing the traffic flow based on the second analysis.

17. The method of claim 16, wherein the parameter comprises one or more of: a number of the vehicles in the image, a speed at which the vehicles are moving in the image, a number of vehicles waiting at an intersection in the image, and types of the vehicles in the image.

18. The method of claim 16, wherein the managing step comprises one or more of: adjusting traffic light operation at an intersection at which the traffic camera is located, notifying an authority of a traffic violation of a particular vehicle in the vehicles, notifying emergency services based on an event detected in the image, and recording and storing the image for future traffic flow study.

19. A method of managing traffic flow, the method comprising:
   receiving, at a traffic camera, an image containing the traffic flow;
   processing, using a processor, the image to mask a plurality of areas in the image that exceed a predetermined number of candelas, wherein the plurality of areas includes at least a portion of a horizon and lit headlights of vehicles;
   after processing, adding edges, which comprise dark lines, around the plurality of areas;
   thereafter analyzing, using the processor, the image to determine a parameter related to vehicles in the traffic flow;
   performing a second analysis, using the processor, on the analyzed image according to a traffic tracking algorithm; and
   managing the traffic flow based on the second analysis.

20. The method of claim 19, wherein the parameter comprises one or more of: a number of the vehicles in the image, a speed at which the vehicles are moving in the image, a number of vehicles waiting at an intersection in the image, and types of the vehicles in the image.

21. The method of claim 19, wherein the managing step comprises one or more of: adjusting traffic light operation at an intersection at which the traffic camera is located, notifying an authority of a traffic violation of a particular vehicle in the vehicles, notifying emergency services based on an event detected in the image, and recording and storing the image for future traffic flow study.

* * * * *